Jan. 23, 1934.  J. KRONSCHNABL  1,944,561
PHOTOGRAPHIC DARK SLIDE DEVICE
Filed May 17, 1932  2 Sheets-Sheet 1
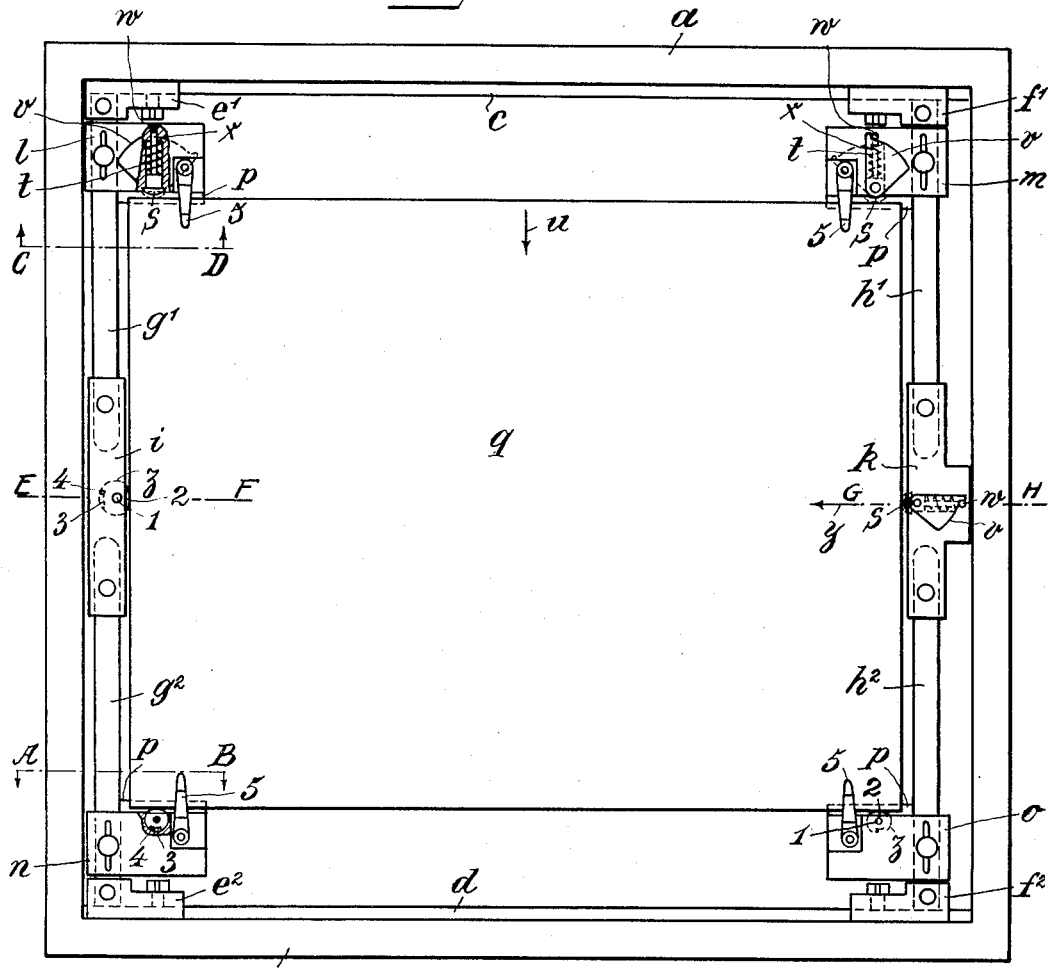
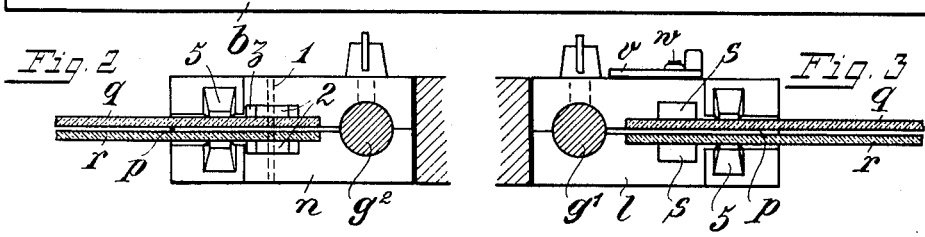
Johann Kronschnabl
INVENTOR;
his Attorney.

Jan. 23, 1934.  J. KRONSCHNABL  1,944,561
PHOTOGRAPHIC DARK SLIDE DEVICE
Filed May 17, 1932  2 Sheets-Sheet 2
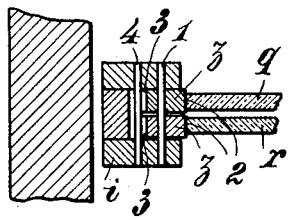
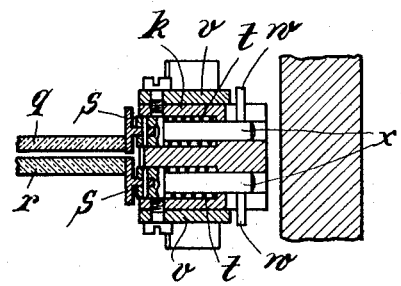
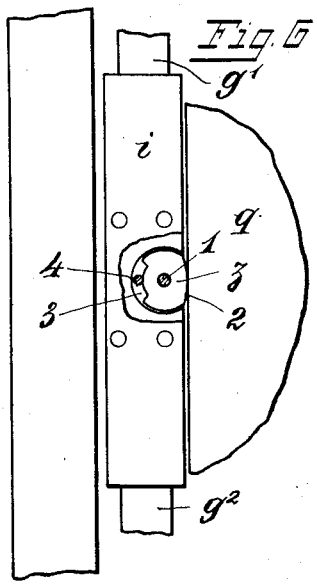
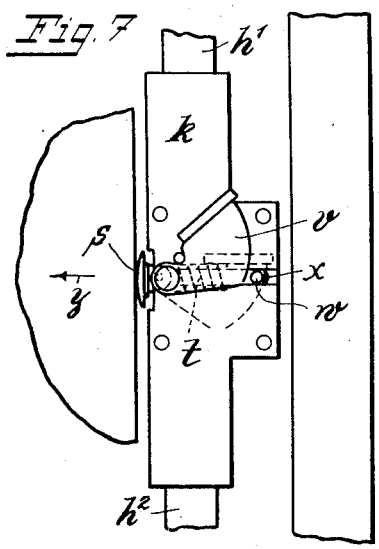
Johann Kronschnabl
INVENTOR
his ATTY.

Patented Jan. 23, 1934

1,944,561

UNITED STATES PATENT OFFICE 1,944,561

PHOTOGRAPHIC DARK SLIDE DEVICE

Johann Kronschnabl, Munich, Germany, assignor of part interest to August Boettger, Munich, Germany Application May 17, 1932, Serial No. 611,836, and in Germany May 21, 1931

4 Claims. (Cl. 95—69)

The invention relates to a photographic dark slide device having for its purpose to bring two congruent negatives or positives in one frame in the dark slide always in exactly the same covering position, so that an exact covering is guaranteed automatically when one of the negatives or positives has been taken out of the frame or replaced therein. This device is needed in reproduction-photography, especially for colours, when the light-sensitive surface is to be exposed consecutively behind several masked negatives of one and the same object which were made with various colour-filters.

The accompanying drawings show the construction of such an arrangement:

Fig. 1 is the dark-slide in plan.

Fig. 2 is a section through the line A—B in Fig. 1,

Fig. 3 a section through line C—D in Fig. 1.

Fig. 4 is an enlarged section through the line E—F in Fig. 1;

Fig. 5 is an enlarged section through the line G—H in Fig. 1; and

Figs. 6 and 7 are plan views of Figs. 4 and 5, respectively, on the same scale as the latter, and substantially corresponding to the smaller scale showing of Fig. 1.

As shown in the drawings, the opposite sides $a$ and $b$ of the dark-slide are furnished with rails $c$ and $d$, on which sliding pieces $e^1$, $e^2$ and $f^1$, $f^2$ are movable. These slides carry in pairs bars $g^1$, $g^2$, $h^1$ and $h^2$, which on their inner ends are fastened to one another through clamping pieces $i$ and $k$. In Fig. 1 the slides $e^1$, $e^2$ and $f^1$, $f^2$, as well as the bars $g^1$, $g^2$, $h^1$, $h^2$ are shown in their outermost positions; they can be pushed along the guide rails $c$, $d$, that is to say, they can be placed nearer to or farther from each other so as to fit the various sizes of plates. On the bars $g^1$, $g^2$, $h^1$, $h^2$, perpendicular to the direction of movement of the slides $e$ and $f$, slides $l$, $m$, $n$, $o$ are carried removably. Each of these slides consists of two parts forming a rebate $p$ for the plates $q$ and $r$. The slides $l$ and $m$ are provided with pairs of stops $s$, which, under pressure by springs $t$, are pushed against the edges of the plates. The effect is to push the plates in the direction of the arrows $u$. The stops $s$ can be released against the action of the springs by the excentrics $v$, which are rotatably mounted on the slides. The excentric faces engage with pins $w$ of the bolts $x$ carrying the stops $s$. In Fig. 1 the stops are shown in their released position, pulled outward; the engaged position in which the holding pressure is applied to the plates $q$ and $r$ is indicated by the shaded lines. The connecting piece $k$ is provided with a corresponding spring fixing arrangement (Figs. 1 and 7). This tends in its working position to move the plates in the direction of the arrows $y$. The slides $n$ and $o$ are provided with rigid, i. e. not spring operated, counter stops $z$. The latter consist of discs, arranged to turn on their shafts 1, with their effective contact faces 2 forming a slight curve. The range of movement of these discs is limited by notches 3, in which the pins 4 engage. A counter stop of similar design is provided in the connecting piece $i$ (Figs. 1 and 6), so that the plates are clamped between the three spring actuated points $s$ and the opposite fixed points and are adjusted within the limits of the notches 3, according to the position of the plate edges. The plates $q$ and $r$ are held securely in the grooves $p$ by the rubbers 5 pressing against the surfaces of the rebates.

It is apparent that the plate-carrying device can be made to adapt itself to any size of plate by moving the slides $e^1$ and $e^2$, $f^1$ and $f^2$ and the slides $l$, $m$, $n$, $o$. Accurate adjustment of the required position of the plates is obtained by means of the spring-actuated stops $s$. These arrest the movement of the plate in such a way that it will always assume, after its removal and return, the same position with mathematical accuracy.

A similar fixing arrangement is also provided in the camera, i. e. in that part of the camera which takes the dark slide, in order always to obtain the same mathematically accurate position of the dark slide in the camera.

What I claim is:

1. In a dark slide for holding two superimposed photographic plates, three pairs of rigid stops engaging two sides of the plates at three points, and three spring pressed stops engaging the two opposite sides of the plates at three points, the plates being free of said stops throughout substantially all their boundaries.

2. In a dark slide according to claim 1, a slide longitudinally movable with respect to the plates carrying each of two rigid and two opposite spring pressed stops.

3. In a dark slide according to claim 1, and in which each of said rigid stops comprises a rotatable disc provided with a notch and a flattened face engaging the plate, and a stationary stud in said notch.

4. In a dark slide for two superimposed photographic plates, a frame, two rails adjacent the top and bottom sides of said frame, two side rails, slides on said rails carrying said side rails, two slides on each of said side rails having rebates within which said plates are fitted, a spring pressed stop on one and a rigid rotatable stop on the other slide of each side rail, a spring pressed stop near the centre of one side rail, and a rigid rotatable stop near the centre of the other side rail.

JOHANN KRONSCHNABL.